United States Patent
Nabuurs et al.

(10) Patent No.: US 9,096,756 B2
(45) Date of Patent: Aug. 4, 2015

(54) PROCESS FOR OBTAINING LOW FREE MONOMER LEVELS IN A BLOCK COPOLYMER EMULSION PREPARED WITH (REVERSE) IODINE TRANSFER POLYMERISATION

(71) Applicant: DSM IP ASSETS B.V., Heerlen (NL)

(72) Inventors: Tijs Nabuurs, Waalwijk (NL); Gerardus Cornelis Overbeek, Waalwijk (NL); Michael Arnoldus Jacobus Schellekens, Waalwijk (NL); Danny Visser, Waalwijk (NL); Frank Vaes, Waalwijk (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 14/140,356

(22) Filed: Dec. 24, 2013

(65) Prior Publication Data

US 2014/0107290 A1    Apr. 17, 2014

Related U.S. Application Data

(63) Continuation of application No. 13/648,080, filed on Oct. 9, 2012, now abandoned, which is a continuation of application No. 12/664,922, filed as application No. PCT/EP2008/057605 on Jun. 17, 2008, now abandoned.

(30) Foreign Application Priority Data

Jun. 21, 2007   (EP) .................... 07012108

(51) Int. Cl.
| | |
|---|---|
| *C09D 153/00* | (2006.01) |
| *C09J 153/00* | (2006.01) |
| *C08L 53/00* | (2006.01) |
| *C08F 293/00* | (2006.01) |

(52) U.S. Cl.
CPC .............. *C08L 53/00* (2013.01); *C08F 293/00* (2013.01); *C08F 293/005* (2013.01); *C09D 153/00* (2013.01); *C09J 153/00* (2013.01); *C08F 2438/00* (2013.01)

(58) Field of Classification Search
CPC .... C08L 53/00; C08F 293/00; C08F 293/005; C09D 153/00; C09J 153/00
USPC ................................... 526/201; 524/457, 832
See application file for complete search history.

(56) References Cited

U.S. PATENT DOCUMENTS

| | | | |
|---|---|---|---|
| 4,158,678 A * | 6/1979 | Tatemoto et al. ............. | 522/141 |
| 5,945,491 A | 8/1999 | Matyjaszewski et al. | |
| 7,034,085 B2 * | 4/2006 | Mestach et al. ............ | 525/359.1 |
| 7,078,473 B2 * | 7/2006 | Lacroix-Desmazes et al. ............................. | 526/343 |
| 2004/0054108 A1 * | 3/2004 | Mestach et al. ............... | 526/319 |

FOREIGN PATENT DOCUMENTS

| | | |
|---|---|---|
| DE | 40 31 607 | 4/1991 |
| EP | 0 489 370 | 6/1992 |
| EP | 0 947 527 | 10/1999 |
| EP | 947527 A1 * | 10/1999 |
| WO | 00/11055 | 3/2000 |
| WO | 03/097704 | 11/2003 |
| WO | 2004/009644 | 1/2004 |
| WO | 2004/009648 | 1/2004 |

* cited by examiner

*Primary Examiner* — Kelechi Egwim
(74) *Attorney, Agent, or Firm* — Nixon & Vanderhye P.C.

(57) ABSTRACT

A process for obtaining an aqueous emulsion comprising a block copolymer by the solution polymerisation of vinyl monomers to obtain block [B] in the presence of a) a radical precursor; and b) an iodine atom containing block [A]; where block [A] and [B] together comprise 0 to 2 wt % of methacrylic acid; where block [A] and block [B] together comprise ≥2.5 wt % of vinyl monomers bearing ionic or potentially ionic water-dispersing groups not including methacrylic acid; and performing a post polymerisation reaction on the block copolymer emulsion obtained in step II; and wherein said aqueous emulsion has a free vinyl monomer level <1000 ppm when having a solids content of ≥20 wt %.

15 Claims, No Drawings

PROCESS FOR OBTAINING LOW FREE MONOMER LEVELS IN A BLOCK COPOLYMER EMULSION PREPARED WITH (REVERSE) IODINE TRANSFER POLYMERISATION

This application is a continuation of commonly owned copending U.S. patent application Ser. No. 13/648,080, filed Oct. 9, 2012 (now abandoned), which is a continuation of application Ser. No. 12/664,922, filed Jun. 1, 2010 (now abandoned) which is the national phase application of international application no. PCT/EP2008/057605, filed Jun. 17, 2008 which designated the U.S. and claims priority to EP Application No. 07012108.2 filed Jun. 21, 2007, the entire contents of each of which are hereby incorporated by reference.

The present invention concerns a process for obtaining low free monomer levels in an aqueous emulsion comprising a block copolymer where the block copolymer is prepared with (reverse) iodine transfer polymerisation, the aqueous emulsion comprising a block copolymer obtained by the process and the use of the aqueous emulsion for coating, adhesive and printing ink compositions.

Control over polymer chain architecture, resulting in for instance block copolymers, may be very beneficial in achieving improved properties when the polymer is used for instance in coating, adhesive and printing ink compositions. Several polymerisation techniques, also known as "living polymerisation techniques" have been found to be able to deliver such kind of control, such as for example Reversible Addition Fragmentation Chain Transfer (RAFT), Atom Transfer Radical Polymerisation (ATRP) and Nitroxide Mediated Controlled Radical Polymerisations (NRP). However each of these techniques have their disadvantages. With ATRP it is currently not possible to incorporate acid functional monomers; NRP can only be done effectively at temperatures above 110° C., and RAFT yields problems with the ultimate RAFT unit that should be removed because of the toxicity and odour of these units.

It has been found that (reverse) Iodine Transfer Polymerisation (RITP) can circumvent all of these problems. RITP may be done at practical temperatures of below 100° C., allowing polymerisations in water and or solution. There are no restrictions of the type of monomer used (for example (meth)acrylic esters, styrene), nor any restriction on the functionality of the monomer (for example ionic functional groups and or crosslinking functional groups). Finally, as the active ingredient is an iodine atom group used at low concentrations, the toxicity profile appears to be more favourable.

RITP is described in for example U.S. Pat. No. 7,078,473 which discloses a radical polymerisation process for the preparation of halogenated polymers and block copolymers using molecular iodine and a radical-generating agent.

US 2007/0066781 discloses a process for preparing iodinated substances having a molecular mass of less than 2000 using molecular iodine and a radical-generating agent.

WO 2004/009648 and US 2004/0054108 disclose a method for making a block or gradient copolymer comprising a step of radically polymerising a mixture of monomers to a iodine atom-containing polymeric compound, wherein the iodine atom-containing polymeric compound comprises at least 50 mol % of methacrylate monomers.

WO 2004/009644 discloses a method for making a methacrylate unit-containing polymer with a polydispersity of less than 1.7 in the presence of a radical precursor and iodine or sulphonyl iodide.

EP 0947527 discloses a controlled free-radical polymerisation process for forming waterborne block copolymers by an emulsion polymerisation process using for example degenerative iodine transfer polymerisation processes.

WO 03/097704 discloses radical polymerisation methods, including the use of molecular iodine, for making halogenated polymers, including block copolymers where at least one block is halogenated.

In RITP molecular iodine is added to a radical polymerisation causing the radicals to be trapped with iodine groups.

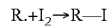

These iodine functional polymer chains will then act as chain transfer agents for growing radical chains. The former iodine functional chain becomes an active radical, while the former active radical becomes iodine end capped.

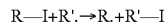

Hence, a growing radical chain has two options, it can propagate by adding monomer units or it can undergo chain transfer by reacting with a iodine functional compound. In this way the radical polymerisation becomes a controlled polymerisation.

However a disadvantage with RITP is that it yields a very high free monomer level, i.e. the rate of monomer conversion is less than 99.5%. The lowest reported free vinyl monomer level, within a practical time frame, is 4,000 ppm (or a vinyl monomer conversion of 99% at 40% solids). Most of the reports on free vinyl monomer levels are, however, significantly higher at around 25,000 ppm (or a conversion of only 97%).

We have now surprisingly found that we can make aqueous emulsions comprising polymer structures obtained through controlled polymerisations using RITP, having a low free monomer content.

According to the invention the provided a process for obtaining an an aqueous emulsion comprising a block copolymer, which process comprises the following steps:
I) solution polymerisation of vinyl monomers to obtain block [B] in the presence of
  a) a radical precursor; and
  b) an iodine atom containing block [A];
to obtain a block copolymer comprising at least block [A] and a different block [B];
where block [A] and [B] together comprise 0 to 2 wt % of methacrylic acid;
where block [A] comprises 0 to 25 wt % of vinyl monomers bearing ionic or potentially ionic water-dispersing groups not including methacrylic acid;
where block [B] comprises 0 to 25 wt % of vinyl monomers bearing ionic or potentially ionic water-dispersing groups not including methacrylic acid;
where block [A] and block [B] together comprise ≥2.5 wt % of vinyl monomers bearing ionic or potentially ionic water-dispersing groups not including methacrylic acid;
II) emulsification of the block copolymer obtained in step I);
III) performing a post polymerisation reaction on the block copolymer emulsion obtained in step II; and
wherein said aqueous emulsion has a free vinyl monomer level <1000 ppm when having a solids content of ≥20 wt %.

The free monomer level may be measured by gas chromatography (GC). A free monomer level of 1000 ppm at 40% solids is equivalent to a monomer conversion of 99.75%. This is considered as an acceptable level of free monomers in a general emulsion. A free monomer level of 500 ppm at 40% solids is equivalent to a monomer conversion of 99.87%. This is considered as a good level of free monomers in a general emulsion. A free monomer level of ≤100 ppm at 40% solids is equivalent to a monomer conversion of ≥99.98%. This is considered as an excellent level of free monomers in a general emulsion.

Preferably the aqueous emulsion has a free vinyl monomer level <1000 ppm when having a solids content of 35+/−15 wt %, more preferably 35+/−10 wt % and most preferably 35+/−5 wt %.

Preferably the aqueous emulsion has a free vinyl monomer level ≤800 ppm, more preferably ≤500 ppm, most preferably ≤400 ppm and especially ≤300 ppm when having a solids content of ≥20 wt %.

Preferably the iodine atom containing block [A] is selected from the group consisting of vinyl polymers, polyurethanes, polyesters, polyethers, polyolefins, alkyds, and or mixtures thereof.

More preferably the iodine atom containing block [A] is obtained by the polymerisation of vinyl monomers in the presence of
 a) a radical precursor and
 b) iodine or an iodine transfer agent.

By iodine is meant molecular iodine and compounds that can form iodine such as $I_3^-$, N-iodosuccinimide etc. The preparation of an iodine atom containing intermediate vinyl polymer is described in WO 04/009648.

The polymerisation of vinyl monomers in step I in the presence of the iodine atom containing block [A] is carried out by solution polymerisation. Preferably the polymerisation of vinyl monomers in step I is carried out by solution polymerisation in an organic solvent.

The resultant copolymer is a block copolymer with block [A] and the vinyl monomers polymerised in step I become block [B] and any optional further blocks [C] depending on the type of polymerisation carried out, such as multi-stage polymerisations. The block copolymer contains a first block [A], a second block [B] and optionally one or more blocks [C].

Preferably the number average molecular weight of block [A] is in the range of from 200 to 60,000 g/mol, more preferably from 500 to 30,000 g/mol and most preferably from 700 to 15,000 g/mol.

Preferably the number average molecular weight of block [B] is in range of from 200 to 60,000 g/mol, more preferably from 500 to 30,000 g/mol and most preferably from 700 to 15,000 g/mol.

Preferably the block copolymer has a PDi (PDi=Mw/Mn) in the range of from 0.1 to 4, more preferably 1 to 3 and especially 1 to 2.

Preferably the block copolymer has an average particle size of ≤600 nm, as determined by light scattering, more preferably ≤300 nm and most preferably ≤250 nm.

Preferably the post-polymerisation reaction to reduce the free monomer level is done with a redox couple comprising an organic or inorganic peroxide or hydroperoxide and a reducing agent. The use of intermediate reactants such as iron ions is optional. Preferred hydroperoxides are t-butyl hydroperoxide, cumyl hydroperoxide, 1,1,3,3-tetramethylbutyl hydroperoxide, isopropylcumyl hydroperoxide, and hydrogenperoxide. Preferred inorganic peroxides are sodium, potassium or ammonium peroxide salts. Preferred organic peroxides are dilauryl peroxide, dibenzoyl peroxide, t-butyl-per-2-ethyl hexanoate, t-butyl perbenzoate, dicumyl peroxide, di-t-butyl peroxide. Preferred reducing agents are ascorbic acid, iso-ascorbic acid, sodium metabisulphite, sodium dithionite and sodium formaldehyde sulfoxylate.

The post-polymerisation reaction to reduce the free monomer level may also be carried out by the reaction of an initiator selected from the group consisting of azo functional initiators, organic peroxides, inorganic peroxides or mixtures thereof.

Preferred azo functional initiators are 2,2'-azodi isobutyronitrile, 2,2'-azodi(2-methylbutyronitrile), VAZO® 68 WSP, VAZO® 56, VAZO® 52 (ex. DuPont) or VA-086 (ex. WAKO Chemicals).

More than one post-polymerisation reaction may be carried out.

Blocks [A] and [B] should be different. The difference can be in the Tg of the blocks, the hydrophilic or hydrophobic nature of the monomers or the concentration of functional monomers within the blocks or combinations thereof.

Where the difference between blocks [A] and [B] is Tg, preferably one of the blocks has a Tg ≤20° C., more preferably ≤0° C. and most preferably −15° C., while the other block preferably has a Tg of ≥10° C., more preferably ≥25° C., most preferably ≥30° C., and especially ≥50° C. Most preferably the difference in Tg between blocks [A] and [B] is ≥40° C.

Where the difference between blocks [A] and [B] is the hydrophilic or hydrophobic nature of the blocks, then one of the blocks preferably contains ≥5 wt % of hydrophilic groups (for example acidic or hydroxyl functional groups), more preferably ≥10 wt % and especially ≥20 wt %, while the other block would contain ≤2 wt %, more preferably ≤1 wt % and most preferably no hydrophilic groups. It is also possible to induce a difference in hydrophilic or hydrophobic nature between the blocks by incorporating very hydrophobic monomers in the hydrophobic segment. Such monomers can be for instance 2-ethyl hexyl(meth)acrylate, lauryl (meth)acrylate, stearyl (meth)acrylate, styrene or modified styrene monomers, or α-methyl styrene. When such very hydrophobic monomers are used in the hydrophobic block, this block may still contain low concentrations of hydrophilic monomers.

Blocks [A] and [B] may contain functional monomers. These can be 1) acid monomers for enhanced stability and/or adhesion, 2) monomers that may typically yield improved adhesion, 3) crosslinking monomers that also may improve adhesion properties, 4) quaternary ammonium groups for antimicrobial activity, anti static properties or reduced grain raising, or 5) monomers that may induce semi-crystalline behaviour. If any of these monomers are used it is preferred that blocks [A] and [B] comprise different functionalities or if similar functionalities then in different concentrations. When the emulsion is stabilised with anionic groups from the block copolymer the acid value of the block copolymer is preferably ≤120 mg KOH/g of solid polymer, more preferably ≤80 mg KOH/g, even more preferably ≤60 mg KOH/g, most preferably ≤50 mg KOH/g and especially in the range of from 2 to 50 mg KOH/g of solid polymer.

Block [B] and block [A] (if block [A] is a vinyl polymer), are derived from free-radically polymerisable olefinically unsaturated monomers, which are also usually referred to as vinyl monomers, and can contain polymerised units of a wide range of such vinyl monomers, especially those commonly used to make binders for the coatings industry.

Examples of vinyl monomers which may be used to form the blocks include but are not limited to olefinically unsaturated monomers such as 1,3-butadiene, isoprene, divinyl benzene, aromatic vinyl monomers such as styrene, α-methyl styrene; vinyl monomers such as acrylonitrile, methacrylonitrile; vinyl halides such as vinyl chloride; vinylidene halides such as vinylidene chloride; vinyl esters such as vinyl acetate, vinyl propionate, vinyl laurate; vinyl esters of versatic acid such as VeoVa 9 and VeoVa 10 (VeoVa is a trademark of Resolution); heterocyclic vinyl compounds; alkyl esters of mono-olefinically unsaturated dicarboxylic acids such as di-n-butyl maleate and di-n-butyl fumarate and, in particular, esters of acrylic acid and methacrylic acid of formula $CH_2=CR^5-COOR^4$ wherein $R^5$ is H or methyl and $R^4$ is optionally substituted $C_1$ to $C_{20}$, more preferably $C_1$ to $C_8$, alkyl, cycloalkyl, aryl or (alkyl)aryl which are also known as acrylic monomers, examples of which are methyl (meth)acrylate, ethyl (meth)acrylate, butyl (meth)acrylate (all isomers), 2-ethylhexyl (meth)acrylate, propyl (meth)acrylate (all isomers), and hydroxyalkyl (meth)acrylates such as hydroxyethyl (meth)acrylate, 2-hydroxypropyl (meth)acrylate, 4-hydroxybutyl (meth)acrylate and their modified analogues like Tone M-100 (Tone is a trademark of Union Carbide Corporation).

The vinyl monomers may also include vinyl monomers carrying functional groups as exemplified below. These may be in-chain, pendant or terminal groups.

Water-dispersing functional groups provide the facility of self-dispersibility, stability, solubility in water and/or a substrate. The water dispersing groups may be ionic, potentially ionic, nonionic or a mixture of such water-dispersing groups.

Preferred vinyl monomers providing nonionic water-dispersing groups include alkoxy polyethylene glycol (meth)acrylates, hydroxy polyethylene glycol (meth)acrylates, alkoxy proplene glycol (meth)acrylates and hydroxy polypropylene glycol (meth)acrylates, preferably having a number average molecular weight of from 350 to 3,000.

Vinyl monomers providing ionic or potentially ionic water-dispersing groups include vinyl monomers providing anionic or potentially anionic, cationic or potentially cationic water-dispersing groups.

Preferred vinyl monomers providing anionic or potentially anionic water-dispersing groups include acrylic acid, itaconic acid, maleic acid, β-carboxyethyl acrylate, monoalkyl maleates (for example monomethyl maleate and monoethyl maleate), citraconic acid, styrenesulphonic acid, vinylbenzylsulphonic acid, vinylsulphonic acid, acryloyloxyalkyl sulphonic acids (for example acryloyloxymethyl sulphonic acid), 2-acrylamido-2-alkylalkane sulphonic acids (for example 2-acrylamido-2-methylethanesulphonic acid), 2-methacrylamido-2-alkylalkane sulphonic acids (for example 2-methacrylamido-2-methylethanesulphonic acid), mono(acryloyloxyalkyl)phosphates (for example, mono(acryloyloxyethyl)phosphate and mono(3-acryloyloxypropyl)phosphates) and mono(methacryloyloxyalkyl)phosphates.

The anionic or potentially anionic water-dispersing groups of the block copolymer may be neutralised before during or after the emulsification step II. Preferred neutralising agents include ammonia, trimethylamine, dimethyl ethanol amine, dimethyl butyl amine, sodium hydroxide, potassium hydroxide and or lithium hydroxide.

Preferred vinyl monomers providing quaternary ammonium and/or quaternisable amine functional group include but are not limited to 2-trimethylammoniumethyl (meth)acrylate chloride, 2-dimethylaminoethyl (meth)acrylate methyl bromide, 2-dimethylaminoethyl (meth)acrylate methyl iodide, 2-dimethylaminoethyl (meth)acrylate dimethyl sulphate, 3-trimethylammoniumpropyl (meth)acrylamide chloride ((M)APTAC), vinylbenzyl trimethylammonium chloride, diallyldimethylammonium chloride, 2-dimethylaminoethyl (meth)acrylate (DMAE(M)A), 2-aminoethyl (meth)acrylate, 2-diethylaminoethyl (meth)acrylate, 3-dimethylaminopropyl (meth)acrylate, 3-dimethylamino-2, 2-dimethylprop-1-yl (meth)acrylate, dimethylaminoneopentyl acylate, N-acryloyl sarcosine methyl ester, N-methacryloyl sarcosine methyl ester, 2-N-morpholinoethyl (meth)acrylate, 2-N-piperidinoethyl (meth)acrylate, 3-dimethylaminopropyl (meth)acrylamide, 2-dimethylaminoethyl (meth)acrylamide, 2-diethylaminoethyl (meth)acrylamide, N-(4-morpholinoethyl) (meth)acrylamidevinylimidazole, N,N-dimethylvinyl benzylamine, where the amine functional monomers can be quaternised with $C_1$-$C_{18}$ alkyl halides such as for example methyl chloride, methyl bromide, methyl iodide, dimethyl sulphate, dodecyl bromide, hexadecyl bromide. The use of permanently quaternised monomers such as 2-trimethylammoniumethyl (meth)acrylate chloride or (M)APTAC is also possible.

Preferably block [A] and [B] together comprise 0 to 2 wt % of methacrylic acid, more preferably block [A] and [B] together comprise 0 to 1 wt % of methacrylic acid and most preferably block [A] and [B] together comprise 0 wt % of methacrylic acid. Preferably the block copolymer comprises 0 to 2 wt % of methacrylic acid, more preferably the block copolymer comprises 0 to 1 wt % of methacrylic acid and most preferably the block copolymer comprises 0 wt % of methacrylic acid.

Preferably block [A] comprises 5 to 25 wt % and more preferably 8 to 22 wt % of vinyl monomers bearing ionic or potentially ionic water-dispersing groups not including methacrylic acid.

Preferably block [B] comprises 0 to 15 wt % and more preferably 0 to 10 wt % of vinyl monomers bearing ionic or potentially ionic water-dispersing groups not including methacrylic acid.

Preferably block [A] and block [B] together comprise 3.0 to 18 and more preferably 3.5 to 15 wt % of vinyl monomers bearing ionic or potentially ionic water-dispersing groups not including methacrylic acid.

Preferably the vinyl monomers bearing ionic or potentially ionic water-dispersing groups are selected from the group consisting of 2 dimethylaminoethyl(meth)acrylate, 3-trimethylammoniumpropyl(meth)acrylamide chloride, acrylic acid, β-carboxyethyl acrylate, itaconic acid and mixtures thereof.

Preferably the vinyl monomers bearing ionic or potentially ionic water-dispersing groups are anionic or potentially anionic water-dispersion groups.

Preferably the vinyl monomers bearing anionic or potentially anionic water-dispersing groups are selected from the group consisting of acrylic acid, β-carboxyethyl acrylate, itaconic acid and mixtures thereof.

Preferred vinyl monomers providing crosslinkable functional groups include hydroxyl functional monomers, epoxide functional monomers, acid functional monomers, carbonyl functional monomers or silane functional monomers. Examples of vinyl monomers providing carbonyl functional groups include acrolein, methacrolein, crotonaldehyde, 4-vinylbenzaldehyde, vinyl alkyl ketones of 4 to 7 carbon atoms such as vinyl methyl ketone. Further examples include acrylamidopivalaldehyde, methacrylamidopivalaldehyde, 3-acrylamidomethyl-anisaldehyde, diacetone acrylate and diacetone methacrylate, and keto-containing amides such as diacetone acrylamide.

Preferred vinyl monomers providing crystallisable monomers include decyl (meth)acrylate, lauryl (meth)acrylate and stearyl (meth)acrylate.

According to an embodiment of the invention there is also provided an aqueous emulsion comprising a block copolymer obtained by a process according to the invention. Preferably the aqueous emulsion has a pH in the range of from 2 to 11, more preferably 2 to 9, even more preferably 2.5 to 8.5 and most preferably 5 to 8.5.

The aqueous emulsions obtained by the process of the present invention may be applied to a variety of substrates including wood, board, metals, stone, concrete, glass, cloth, leather, paper, plastics, foam and the like, by any conventional method including brushing, dipping, flow coating, spraying, flexo printing, gravure printing, ink-jet printing, any other graphic arts application methods and the like. The aqueous carrier medium is removed by natural drying or accelerated drying (by applying heat) to form a coating.

Accordingly, in a further embodiment of the invention there is provided a coating, an adhesive, a polymeric film, a printing ink and/or an overprint lacquer obtained from the aqueous emulsions obtained by the process of the present invention.

The aqueous emulsions obtained by the process of the present invention may contain conventional ingredients; examples include pigments, dyes, emulsifiers, surfactants, plasticisers, thickeners, heat stabilisers, levelling agents, anti-cratering agents, fillers, sedimentation inhibitors, UV absorbers, antioxidants, drier salts, organic co-solvents, wetting agents and the like introduced at any stage of the production process or subsequently. It is possible to include an amount of antimony oxide in the dispersions to enhance the fire retardant properties. Optionally, the aqueous emulsions may comprise additional polymers not prepared using RITP.

Suitable organic co-solvents which may be added during the process or after the process during formulation steps are well known in the art and include xylene, toluene, methyl ethyl ketone, acetone, diethylene glycol and 1-methyl-2-pyrrolidinone.

Optionally an external crosslinking agent may be added to the aqueous emulsions obtained by the process of the present invention to aid crosslinking during or after drying.

The solids content of the aqueous emulsions obtained by the process of the present invention is preferably within the range of from 20 to 60 wt %, and most preferably within the range of from 30 to 50 wt %.

The present invention is now illustrated by reference to the following examples. Unless otherwise specified, all parts, percentages and ratios are on a weight basis.

In the examples, the following abbreviations and terms are specified:
Solvent=butyl acetate
MMA=methyl methacrylate
2-HEMA=2-hydroxyethyl methacrylate
AMBN=2,2'-azobis-(2-methylbutyronitrile)
AA=acrylic acid
MAA=methacrylic acid
BA=butyl acrylate
tBHPO=t-butyl hydroperoxide
DMEA=dimethyl ethanolamine
IAA=i-ascorbic acid
$I_2$=iodine

EXAMPLE 1

Block Copolymer Emulsion

Step I
To prepare block [A], a reactor was charged with 395.6 parts of butyl acetate, 138.1 parts of methyl methacrylate, 7.2 parts of iodine and 16.5 parts of 2,2'-azobis-(2-methylbutyronitrile), and the contents were heated to 80° C. As soon as the colour of the reaction phase changed from brown to yellow, 34.5 parts of acrylic acid were charged to the reactor and the mixture was allowed to polymerise at 80° C. for 6 hours.

To prepare block [B] the reactants comprising 402.7 parts of butyl acrylate and 5.4 parts of 2,2'-azobis-(2-methylbutyronitrile) were added to the solution of block [A]. The mixture was allowed to react for 6 hours at 80° C.

Step II
The resultant block copolymer solution was cooled to 60° C. and 34.1 parts of dimethyl ethanolamine were added.

Next, the block copolymer was emulsified by adding 440 parts of demineralised water.

At this point, the monomer conversion was 97%, corresponding to a free monomer content of the block copolymer emulsion of 11700 ppm.

Step III
To the block copolymer emulsion obtained after step II) 0.7 parts of t-butyl hydroperoxide and 0.3 parts of water were added. Next a solution of 1.5 parts of i-ascorbic acid in 29.5 parts of water was added over a period of 30 minutes. 15 minutes after the start of the i-ascorbic acid feed, another 0.7 parts of t-butyl hydroperoxide and 0.3 parts of water were added. At the end of the i-ascorbic acid feed the emulsion was kept at 60° C. for another hour after which it was cooled and filtered through a 75 μm filter cloth.

The final free monomer level was 680 ppm and the solids content was 41%, corresponding to a final monomer conversion of 99.82%.

EXAMPLES 2 TO 6

Block copolymer emulsion were prepared according to the process for example 1 using components as listed in Table 1 below.

All of the emulsions prepared in Examples 1 to 6 had a particle size in the range of from 50 to 350 nm.

COMPARATIVE EXAMPLE 1 (CE1)

A block copolymer emulsion was prepared according to the process for Example 1 using components as listed in Table 1 below, where methacrylic acid was used instead of acrylic acid. However the after step II was completed the emulsion was extremely unstable and step III could not be carried out.

Results:
The amount of final free monomer and the total monomer conversion is given in Table 1 below.

TABLE 1

|  | Example | | | | | | |
|---|---|---|---|---|---|---|---|
|  | 1 | 2 | 3 | 4 | 5 | 6 | CE1 |
| Step I | | | | | | | |
| Block A | | | | | | | |
| Solvent | 395.6 | 395.6 | 395.6 | 395.6 | 401.5 | 384.5 | 400 |
| AA | 34.5 | 34.5 | — | 80.5 | 29.2 | 28.0 | — |

TABLE 1-continued

| | Example | | | | | | |
|---|---|---|---|---|---|---|---|
| | 1 | 2 | 3 | 4 | 5 | 6 | CE1 |
| MAA | — | — | — | — | — | — | 29.1 |
| MMA | 138.1 | 138.1 | — | 322.2 | — | — | — |
| 2-HEMA | — | — | 115.1 | — | — | — | — |
| AMBN | 16.5 | 16.5 | 16.5 | 16.5 | 8.4 | 32.1 | 16.5 |
| BA | — | — | 172.6 | — | 262.7 | 251.6 | 261.7 |
| $I_2$ | 7.2 | 7.2 | 7.2 | 7.2 | 3.6 | 14 | 7.3 |
| Block B | | | | | | | |
| AA | — | — | 28.8 | — | — | — | — |
| BA | 402.7 | 402.7 | — | 172.6 | — | — | — |
| AMBN | 5.4 | 5.4 | 5.4 | 5.4 | 2.7 | 10.5 | 5.4 |
| MMA | — | — | 402.7 | — | 291.9 | 279.5 | 290.8 |
| Step II | | | | | | | |
| DMEA | 34.1 | 34.1 | 28.5 | 79.6 | 28.9 | 27.6 | 24.1 |
| Water | 440 | 440 | 364 | 445 | 445 | 519 | 519 |
| Conversion % | 97 | 97 | 96 | 93 | 97 | 97 | 36 |
| Free monomer ppm | 11700 | 11700 | 13100 | 26400 | 11800 | 10800 | 241300 |
| Step III | | | | | | | |
| tBHPO | 0.7 | 1.5 | 1.0 | 1.9 | 1.1 | 1.2 | * |
| Water | 0.3 | 0.6 | 0.4 | 0.8 | 0.5 | 0.5 | * |
| IAA | 1.5 | 2.9 | 2.1 | 3.8 | 2.2 | 2.3 | * |
| Water | 29.5 | 59.0 | 41.9 | 76.3 | 44.2 | 46.4 | * |
| tBHPO | 0.7 | 1.5 | 1.0 | 1.9 | 1.1 | 1.2 | * |
| Water | 0.3 | 0.6 | 0.4 | 0.8 | 0.5 | 0.5 | * |
| Final Conversion % | 99.82 | 99.92 | 99.92 | 99.92 | 99.92 | 99.88 | * |
| Solids | 41 | 41 | 35.1 | 39.6 | 40.6 | 39.8 | * |
| Final Free Monomer ppm | 680 | 285 | 335 | 290 | 320 | 406 | * |

*= unstable, no further treatment possible

The invention claimed is:

1. A process for obtaining an aqueous emulsion comprising a block copolymer, which process comprises the following steps:
  I) solution polymerisation of vinyl monomers to obtain block [B] in the presence of
    a) a radical precursor; and
    b) an iodine atom containing block [A];
  to obtain a block copolymer comprising at least block [A] and a different block [B];
  where block [A] and [B] together comprise 0 to 2 wt % of methacrylic acid;
  where block [A] comprises 0 to 25 wt % of vinyl monomers bearing ionic or potentially ionic water-dispersing groups not including methacrylic acid;
  where block [B] comprises 0 to 25 wt % of vinyl monomers bearing ionic or potentially ionic water-dispersing groups not including methacrylic acid;
  where block [A] and block [B] together comprise >2.5 wt % of vinyl monomers bearing ionic or potentially ionic water-dispersing groups not including methacrylic acid;
  II) emulsification of the block copolymer obtained in step I);
  III) performing a post polymerisation reaction on the block copolymer emulsion obtained in step II; and
  wherein said aqueous emulsion has a free vinyl monomer level <1000 ppm when having a solids content of >20 wt %.

2. A process according to claim 1 where block [A] comprises 5 to 25 wt % of vinyl monomers bearing ionic or potentially ionic water-dispersing groups not including methacrylic acid.

3. A process according to claim 1 where block [B] comprises 0 to 15 wt % of vinyl monomers bearing ionic or potentially ionic water-dispersing groups not including methacrylic acid.

4. A process according to claim 1 where block [A] and block [B] together comprise 3.0 to 18 wt % of vinyl monomers bearing ionic or potentially ionic water-dispersing groups not including methacrylic acid.

5. A process according to claim 1 where the vinyl monomers bearing ionic or potentially ionic water-dispersing groups are selected from the group consisting of 2-dimethylaminoethyl(meth)acrylate, 3-trimethylammoniumpropyl (meth)acrylamide chloride, acrylic acid, β-carboxyethyl acrylate, itaconic acid and mixtures thereof.

6. A process according to claim 1 where the vinyl monomers bearing ionic or potentially ionic water-dispersing groups are anionic or potentially anionic water-dispersion groups.

7. A process according to claim 6 where the vinyl monomers bearing anionic or potentially anionic water-dispersing groups are selected from the group consisting of acrylic acid, β-carboxyethyl acrylate, itaconic acid and mixtures thereof.

8. A process according to claim 1 wherein the difference in Tg between blocks [A] and [B] is >40° C.

9. A process according to claim 1 wherein said aqueous emulsion has a free vinyl monomer level <800 ppm.

10. A process according to claim 1 where the iodine atom containing block [A] is selected from the group consisting of vinyl polymers, polyurethanes, polyesters, polyethers, alkyds and or mixtures thereof.

11. A process according to claim 1 where the iodine atom containing block [A] is obtained by the polymerisation of vinyl monomers in the presence of
  a) a radical precursor and
  b) iodine or an iodine transfer agent.

12. A process according to claim 1 where the post polymerisation reaction is carried out by the reaction of a redox couple comprising an organic or inorganic peroxide or hydroperoxide and a reducing agent.

13. A process according to claim 1 where the post polymerisation reaction is carried out by the reaction of an initiator selected from the group consisting of azo functional initiators, organic peroxides, inorganic peroxides or mixtures thereof.

14. A process according to claim 1 where the block copolymer comprises an additional block [C].

15. An aqueous emulsion comprising a block copolymer obtained by a process according to claim 1.

* * * * *